US012562041B2

(12) United States Patent
Lee et al.

(10) Patent No.: US 12,562,041 B2
(45) Date of Patent: Feb. 24, 2026

(54) MONITORING APPARATUS AND SYSTEM

(71) Applicant: HANWHA VISION CO., LTD., Seongnam-si (KR)

(72) Inventors: Ho Jung Lee, Seongnam-si (KR); Joo Bog Kim, Seongnam-si (KR); Mi Ran Cho, Seongnam-si (KR); Yeon Woo Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/820,826

(22) Filed: Aug. 30, 2024

(65) Prior Publication Data

US 2024/0420556 A1    Dec. 19, 2024

Related U.S. Application Data

(63) Continuation of application No. 17/982,741, filed on Nov. 8, 2022, now abandoned, which is a (Continued)

(30) Foreign Application Priority Data

Jan. 23, 2017    (KR) ........................ 10-2017-0010382

(51) Int. Cl.
*G08B 13/196* (2006.01)
*G06V 20/52* (2022.01)
*H04N 7/18* (2006.01)

(52) U.S. Cl.
CPC ....... *G08B 13/19691* (2013.01); *G06V 20/52* (2022.01); *G08B 13/196* (2013.01); (Continued)

(58) Field of Classification Search
CPC ........... G06K 9/00718; G06K 9/00771; G08B 13/19671; G08B 13/19645; (Continued)

(56) References Cited

U.S. PATENT DOCUMENTS 9,208,226 B2    12/2015  Park et al.
9,418,153 B2    8/2016   Mao et al.
(Continued)

FOREIGN PATENT DOCUMENTS

CN    102695045 A    9/2012
CN    104040601 A    9/2014
(Continued)

OTHER PUBLICATIONS

Communication dated Aug. 28, 2017 issued by the International Searching Authority in counterpart Application No. PCT/KR2017/002229 (PCT/ISA/210).
(Continued)

*Primary Examiner* — Neil R Mikeska
(74) *Attorney, Agent, or Firm* — Sughrue Mion, PLLC

(57) ABSTRACT

Provided is a monitoring apparatus including a communication unit which receives streaming data and metadata of a video from each of a plurality of cameras installed indoors when the cameras obtain videos by capturing specific areas, respectively; a metadata analysis unit which analyzes the received metadata and extracts information about an event that occurred; a video selection unit which selects a video containing an area in which the event occurred from the videos based on the extracted information about the event; and a screen unit which receives the selected video from the video selection unit and immediately displays the received video when the monitoring apparatus is operated.

20 Claims, 11 Drawing Sheets

Related U.S. Application Data continuation of application No. 16/446,895, filed on Jun. 20, 2019, now Pat. No. 11,495,103, which is a continuation of application No. PCT/KR2017/002229, filed on Feb. 28, 2017.

(52) U.S. Cl.
CPC . G08B 13/19645 (2013.01); G08B 13/19673 (2013.01); H04N 7/181 (2013.01)

(58) Field of Classification Search
CPC ........ G08B 13/19684; G08B 13/19673; G08B 13/196; G08B 13/19691; H04N 7/181
See application file for complete search history.

(56)                    References Cited

U.S. PATENT DOCUMENTS

| 9,948,902 | B1 | 4/2018 | Trundle |
|---|---|---|---|
| 10,025,854 | B2 | 7/2018 | Gong et al. |
| 10,204,275 | B2 | 2/2019 | Shin et al. |
| 2003/0025599 | A1 | 2/2003 | Monroe |
| 2004/0219980 | A1 | 11/2004 | Bassett et al. |
| 2005/0114324 | A1 | 5/2005 | Mayer |
| 2013/0166711 | A1 | 6/2013 | Wang et al. |
| 2014/0085501 | A1 | 3/2014 | Tran |
| 2015/0092052 | A1 | 4/2015 | Shin et al. |
| 2015/0163535 | A1 | 6/2015 | McCarthy, III et al. |
| 2015/0264296 | A1 | 9/2015 | Devaux |
| 2016/0034477 | A1 | 2/2016 | Mao et al. |
| 2016/0093336 | A1 | 3/2016 | Laska et al. |
| 2016/0110041 | A1 | 4/2016 | Fuzell-Casey |
| 2016/0110884 | A1 | 4/2016 | Fuzell-Casey |
| 2016/0342846 | A1 | 11/2016 | Gordon et al. |
| 2017/0070775 | A1 | 3/2017 | Taxier et al. |
| 2017/0177946 | A1 | 6/2017 | Citerin |
| 2018/0189942 | A1 | 7/2018 | Matsukawa |

FOREIGN PATENT DOCUMENTS

| CN | 105323550 | A | 2/2016 |
|---|---|---|---|
| JP | 2006-67139 | A | 3/2006 |
| JP | 2006-217067 | A | 8/2006 |
| JP | 2009-171472 | A | 7/2009 |
| KR | 10-2012-0105205 | A | 9/2012 |
| KR | 10-2014-0098959 | A | 8/2014 |
| KR | 10-2015-0035322 | A | 4/2015 |
| KR | 10-2015-0053162 | A | 5/2015 |
| KR | 10-2016-0053601 | A | 5/2016 |
| KR | 10-1703413 | B1 | 2/2017 |
| WO | 2013/095773 | A1 | 6/2013 |
| WO | 2016/129731 | A1 | 8/2016 |

OTHER PUBLICATIONS

Communication issued Mar. 26, 2024 by the Korean Intellectual Property Office in Korean Patent Application No. 10-2017-0010382.

Lai Zefeng, "Multiple Targets Tracking System Based on Multiple Collaborative Cameras", Sun Yat-sen University, Chinese Doctoral Dissertation & Master's Theses Full-text Database (Master), Jan. 2015, 7 pages total.

Communication dated Nov. 9, 2021 issued by the State Intellectual Property Office of P.R. China in counterpart Chinese Application No. 201780080760.X.

Communication issued Aug. 20, 2020 by the State Intellectual Property Office of P.R. China in counterpart Chinese Application No. 20170080760.X.

Communication dated Aug. 28, 2017 issued by the International Searching Authority in counterpart Application No. PCT/KR2017/002229 (PCT/ISA/237).

Communication issued Nov. 5, 2024 by the Korean Intellectual Property Office in Korean Patent Application No. 10-2017-0010382.

```
ff->utc = 1457338735;
ff->cam.ID = 1;
ff->numObj = 1;
ff->obj[0].objID = 2;
ff->obj[0].left = -0.188661;
ff->obj[0].right = -0.112414;
ff->obj[0].top = -0.228162;
ff->obj[0].bottom = -0.074316;
```

CONTROL UNIT   ~11

METADATA ANALYSIS UNIT   ~111

VIDEO SELECTION UNIT   ~112

VIDEO SEARCH UNIT   ~113

Live view Cam 1

2

MONITORING APPARATUS AND SYSTEM

CROSS REFERENCE TO RELATED APPLICATIONS

This is a Continuation Application of U.S. application Ser. No. 17/982,741 filed Nov. 8, 2022, which is a Continuation Application of U.S. application Ser. No. 16/446,895 filed Jun. 20, 2019, now issued U.S. Pat. No. 11,495,103, which is a Continuation Application of International Patent Application No. PCT/KR2017/002229 filed Feb. 28, 2017, which claims priority to Korean Patent Application No. 10-2017-0010382, filed Jan. 23, 2017. The disclosures of which are incorporated herein by reference in their entireties.

TECHNICAL FIELD

The present disclosure relates to a monitoring apparatus and system, and more particularly, to a monitoring apparatus and system which enable a user to immediately monitor a pet or a child through a video without selecting and checking in which of a plurality of videos the pet or the child exists.

BACKGROUND ART

Generally, surveillance systems are widely used in various places including banks, department stores, and residential areas. These surveillance systems can be used for crime prevention and security purposes. The most commonly used surveillance system is a closed circuit television (CCTV) system in which a camera is installed at an appropriate location to capture a desired area, and a user keeps an eye on the desired area by monitoring a video captured by the camera.

Meanwhile, there have been many households that have raised pets such as dogs or cats in the house or raised children. However, when a user is out, a pet or a child can be left alone in the house. In this case, the pet or the child can be injured while walking around or playing in the house, or property can be damaged. Therefore, CCTV systems are increasingly used at home, and many home cameras which are dedicated cameras installed at home are being released recently. Accordingly, a user can monitor a video of a camera in real time or retrieve and monitor a past video by using a monitoring apparatus in order to check a pet or a child at home from outside the home.

In the past, only one home camera was often installed in one house. However, since an angle of field of a home camera is limited, it is not easy for one home camera to capture all areas in the house. In particular, if each area is separated by a wall, it is impossible for one home camera to capture all areas in the house. Therefore, recently, a plurality of home cameras are increasingly being installed in one house, one camera in each of a living room, a kitchen, each room, etc.

However, if a plurality of home cameras are installed, when a user executes the operation of a monitoring apparatus to monitor a video of a camera from outside the home, the monitoring apparatus provides a list of the home cameras so that the user can select one of videos of the home cameras. However, the user cannot know which of the home cameras is currently capturing a pet or a child.

Even when performing a search by inputting a specific time condition as a search condition, the user cannot know which of the home cameras was capturing the pet or the child at the input time. Therefore, the user has to select all the cameras on the list and check all videos one by one.

Disclosure

Technical Problem

Provided are a monitoring apparatus and system which enable a user to immediately monitor a pet or a child through a video without selecting and checking in which of a plurality of videos the pet or the child exists.

Additional aspects will be set forth in part in the description which follows and, in part, will be apparent from the description, or may be learned by practice of the presented embodiments.

Technical Solution

According to an aspect of an embodiment, a monitoring apparatus includes: a communication unit which receives streaming data and metadata of a video from each of a plurality of cameras installed indoors when the cameras obtain videos by capturing specific areas, respectively; a metadata analysis unit which analyzes the received metadata and extracts information about an event that occurred; a video selection unit which selects a video containing an area in which the event occurred from the videos based on the extracted information about the event; and a screen unit which receives the selected video from the video selection unit and immediately displays the received video when the monitoring apparatus is operated.

According to an aspect of an embodiment, a monitoring apparatus includes: a communication unit which receives streaming data and metadata of a video from each of a plurality of cameras installed indoors when the cameras obtain videos by capturing specific areas, respectively; a metadata analysis unit which analyzes the received metadata and extracts information about an event that occurred; a video selection unit which selects a video containing an area in which the event occurred from the videos based on the extracted information about the event; a screen unit which receives the selected video from the video selection unit and immediately displays the received video; and a storage unit which stores the received streaming data and metadata of the videos.

According to an aspect of an embodiment, a monitoring system includes: a plurality of cameras installed indoors and each including an image pickup unit which obtains a video by capturing a specific area and an event occurrence determination unit which determines whether an event has occurred in the video; and a monitoring apparatus including a communication unit which receives streaming data and metadata of the video from each of the cameras, a video selection unit which selects a video containing an area in which the event occurred from the videos based on information about the event that occurred, and a screen unit which receives the selected video from the video selection unit and displays the received video.

Advantageous Effects

Embodiments of the present disclosure provide at least one of the following advantages.

When a user executes the operation of a monitoring apparatus, a video of a pet or a child moving is immediately displayed on a screen unit.

In addition, when the user searches for a video by inputting a specific search condition, a video of a pet or a child moving among videos matching the specific search condition is displayed on the screen unit.

Therefore, the user can immediately monitor a pet or a child through a video without selecting and checking in which of a plurality of videos the pet or the child exists.

However, the effects of the embodiments are not restricted to the one set forth herein. The above and other effects of the embodiments will become more apparent to one of daily skill in the art to which the embodiments pertain by referencing the claims.

DESCRIPTION OF DRAWINGS

These and/or other aspects will become apparent and more readily appreciated from the following description of the embodiments, taken in conjunction with the accompanying drawings in which.

MODE FOR INVENTION

Figure 1:
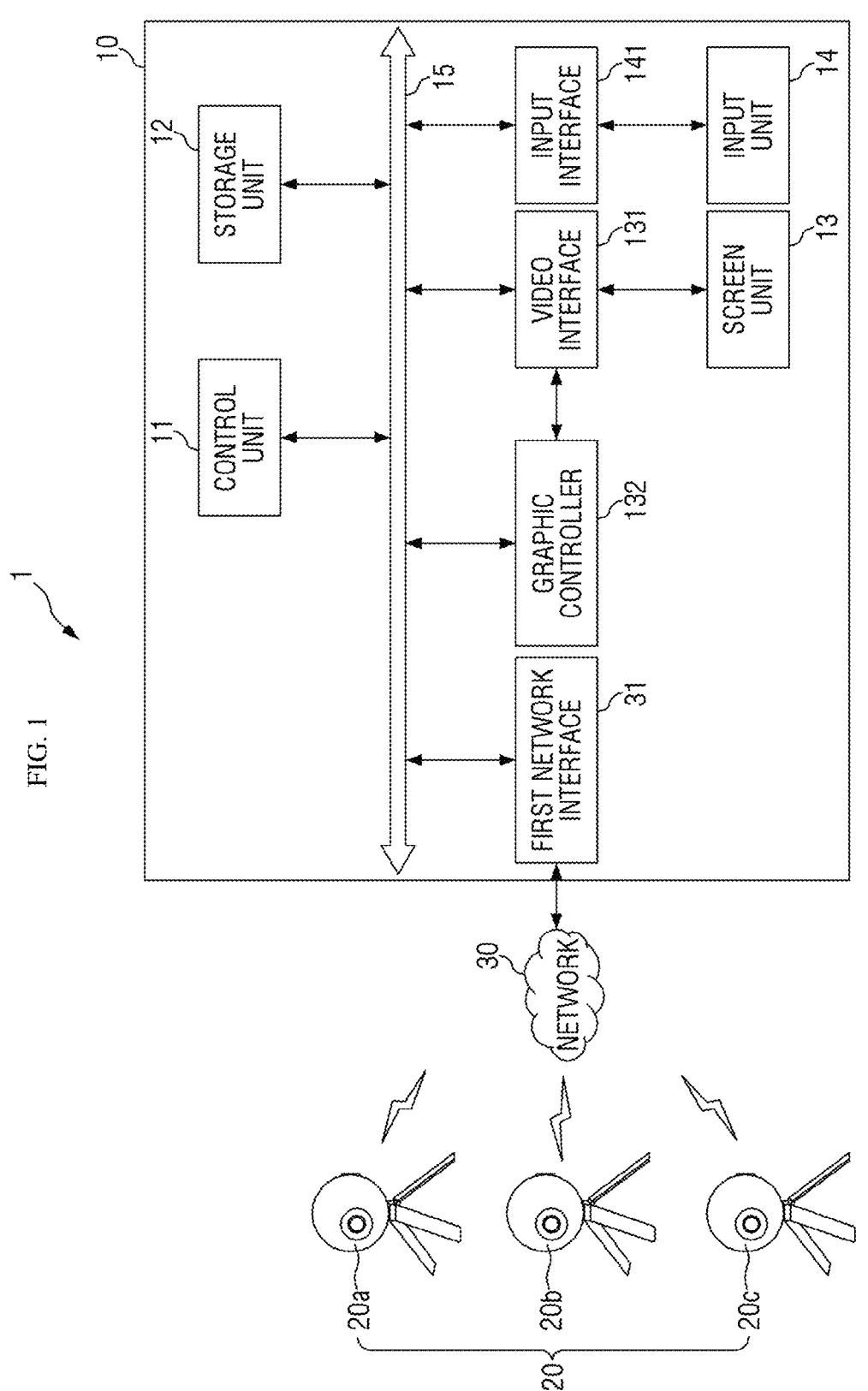
FIG. 1 is a block diagram of a monitoring system 1 according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like reference numerals refer to like components throughout the specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, but do not preclude the presence or addition of one or more other components.

Hereinafter, exemplary embodiments of the present disclosure will be described in detail with reference to the accompanying drawings.

Figure 2:
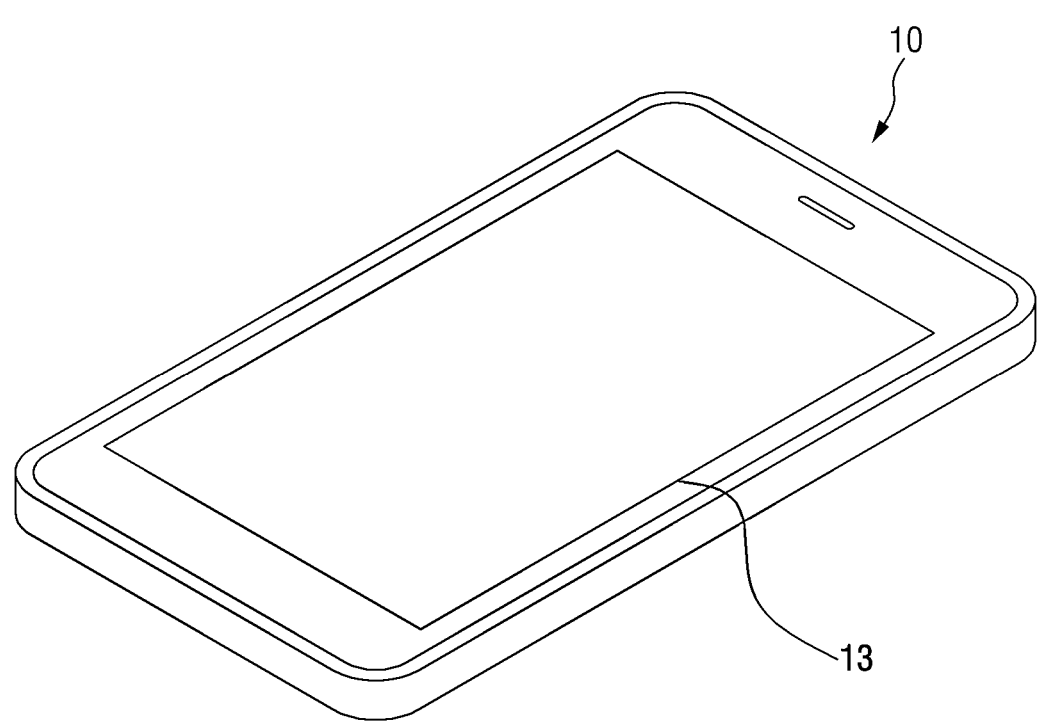
FIG. 2 is a perspective view of a monitoring apparatus 10 of FIG. 1.

FIG. 1 is a block diagram of a monitoring system 1 according to an embodiment of the present disclosure. FIG. 2 is a perspective view of a monitoring apparatus 10 of FIG. 1.

According to a method of using the monitoring system 1 according to the embodiment of the present disclosure, a plurality of cameras 20 are installed in various directions at various locations in an indoor space and obtain videos by capturing different areas, respectively. Here, a user may execute the operation of the monitoring apparatus 10 or may perform a search by inputting a search condition. Then, the monitoring apparatus 10 first displays a video of an object 2 (see FIG. 6) such as a pet or a child among the videos transmitted by the cameras 20. Therefore, the user can immediately monitor the object 2 through the video without selecting and checking in which of the videos the object 2 exists.

As illustrated in FIG. 1, the monitoring system 1 according to the embodiment of the present disclosure includes the cameras 20 which obtain videos by capturing specific areas and the monitoring apparatus 10 which receives and displays streaming data of the videos obtained by the cameras 20. The cameras 20 and the monitoring apparatus 10 may be connected to each other in a wired or wireless manner to transmit and receive video data or signals.

Each of the cameras 20 according to the embodiment of the present disclosure obtains an image by capturing a specific area and receiving an image signal for the specific area. To this end, each of the cameras 20 generally includes an image pickup device such as a charge coupled device (CCD) or a complementary metal oxide semiconductor (CMOS) image sensor. Each of the cameras 20 may be a pan-tilt camera capable of panning and tilting, in particular, may be a camera that can pan 360 degrees to capture all directions including front, back, left and right directions.

Alternatively, each of the cameras 20 may be a 360-degree camera introduced recently. The 360-degree camera refers to a camera capable of capturing all directions simultaneously using a plurality of fisheye lenses, instead of the camera itself physically panning or tilting. In this case, an image obtained by the 360-degree camera is panned or tilted by software installed in the monitoring apparatus 10. The cameras 20 according to the embodiment of the present disclosure are not limited to the above examples, and various cameras 20 can be used as long as they can capture a plurality of areas. The cameras 20 may also perform a video analysis function. This will be described in detail later.

The monitoring apparatus 10 according to the embodiment of the present disclosure receives and displays videos obtained by the cameras 20. As illustrated in FIG. 2, the monitoring apparatus 10 may be a portable device that can be easily carried by a user, such as a smartphone, a tablet PC, a laptop computer, etc. However, the monitoring apparatus 10 is not limited to the above examples and may also be a device that cannot be easily carried, such as a desktop computer.

A user can install and delete various applications in and from the monitoring apparatus 10. Of these, a camera control application may be executed, and a signal for controlling panning or tilting of an image may be generated using an input method such as a touch or a mouse. If an image can be panned or tilted by physical panning or tilting of a camera 20 itself, the control signal is transmitted to the camera 20. However, if the camera 20 is a 360-degree camera, the control signal pans or tilts the image through the software installed in the monitoring apparatus 10.

The monitoring apparatus 10 includes a control unit 11, a storage unit 12, and a screen unit 13 as illustrated in FIG. 1. These components may be connected to each other through a bus 15 so as to communicate with each other. All components included in the control unit 11 may be connected to the bus 15 through at least one interface or adapter or may be directly connected to the bus 15. In addition, the bus 15 may be connected to sub-systems other than the above-mentioned components. The bus 15 includes a memory bus, a memory controller, a peripheral bus, a local bus, etc.

The control unit 11 controls the overall operation of the monitoring apparatus 10. For example, the control unit 11 performs processing and controlling for signal and data communication between a first network interface 31 and the cameras 20 and performs video processing such as decoding and rendering when receiving video streaming data from the cameras 20 through the first network interface 31. In addition, the control unit 11 stores metadata 3 (see FIG. 4) when receiving the metadata 3 from the cameras 20. When a user performs a search by inputting a search condition, the control unit 11 retrieves search results matching the condition by searching the stored metadata 3. When a video selection unit 112 (see FIG. 5) selects a specific video from a plurality of videos, the control unit 11 controls the screen unit 13 to load and display the specific video. The control unit 11 may be a central processing unit (CPU), a microcontroller unit (MCU), or a digital signal processor (DSP). However, the control unit 11 is not limited to these examples, and various logical operation processors can be used. The control unit 11 will be described in detail later.

The storage unit 12 stores programs for processing and controlling operations of the monitoring apparatus 10, various data generated during the execution of each program, received signals, etc. In addition, the storage unit 12 stores the video streaming data and the metadata 3 received from the cameras 20. The storage unit 12 may be embedded in the monitoring apparatus 10. However, in the case of a network camera system, a separate device such as a network video recorder (NVR) may be provided. The storage unit 12 includes a nonvolatile memory device and a volatile memory device. The nonvolatile memory device may be a NAND flash memory that is small in volume, lightweight and resistant to external impact, and the volatile memory device may be a double data rate synchronous dynamic random-access memory (DDR SDRAM).

The screen unit 13 displays a video transmitted from each camera 20. The video may be a real-time video captured and obtained in real time by each camera 20 or may be a video loaded and displayed after being previously captured and stored in the storage unit 12. If the monitoring apparatus 10 does not provide a touch function, an input unit 14 is provided separately. The most commonly used examples of the input unit 14 include a mouse, a keyboard, a joystick, and a remote control. The input unit 14 may be connected to the bus 15 through an input interface 141 such as a serial port, a parallel port, a game port, a universal serial bus (USB), etc. However, if the monitoring apparatus 10 provides the touch function, the screen unit 13 may include a touch sensor 111. In this case, the input unit 14 need not be provided separately, and a user may directly input a touch signal through the screen unit 13. A touch may be performed using a finger. However, embodiments are not limited to this case, and a touch may also be performed using a stylus pen equipped with a tip through which a microcurrent can flow. Even if the monitoring apparatus 10 provides the touch function, a separate touch pad may be provided as the input unit 14 if the screen unit 13 does not include a touch sensor.

The screen unit 13 may be of various types such as a liquid crystal display (LCD), an organic light emitting display (OLED), a cathode ray tube (CRT), and a plasma display panel (PDP). The screen unit 13 may be connected to the bus 15 through a video interface 131, and data transmission between the screen unit 13 and the bus 15 may be controlled by a graphic controller 132.

The monitoring apparatus 10 may be connected to a network 30. Therefore, the monitoring apparatus 10 may be connected to other devices through the network 30 to transmit and receive various data and signals including the metadata 3. Here, the first network interface 31 may receive communication data in the form of one or more packets from the network 30, and the monitoring apparatus 10 may store the received communication data for processing by the control unit 11. Similarly, the monitoring apparatus 10 may store communication data to be transmitted in the storage unit 12 in the form of one or more packets, and the first network interface 31 may transmit the communication data to the network 30.

The first network interface 31 may include a first network interface card, a modem, etc., and the network 30 may include various wired/wireless communication methods such as the Internet, a wide area network (WAN), a local area network (LAN), a telephone network 30, and direct connection communication.

The cameras 20 and the monitoring apparatus 10 may be directly connected to each other through the network 30, but may also be connected via a separate storage server (not illustrated). The storage server is formed separately from the storage unit 12 of the monitoring apparatus 10 and stores the video streaming data and the metadata 3 of the cameras 20. Therefore, even when the monitoring apparatus 10 is powered off or not in a state to receive data, various data is stored in the storage server. Then, when the monitoring apparatus 10 is powered on or in a state to receive data, the data stored in the storage server may be transmitted from the storage server to the monitoring apparatus 10. The storage server may be a storage device such as an NVR or a digital video recorder (DVR) or may be a storage device such as cloud provided by a separate service provider.

Figures 3, 4:
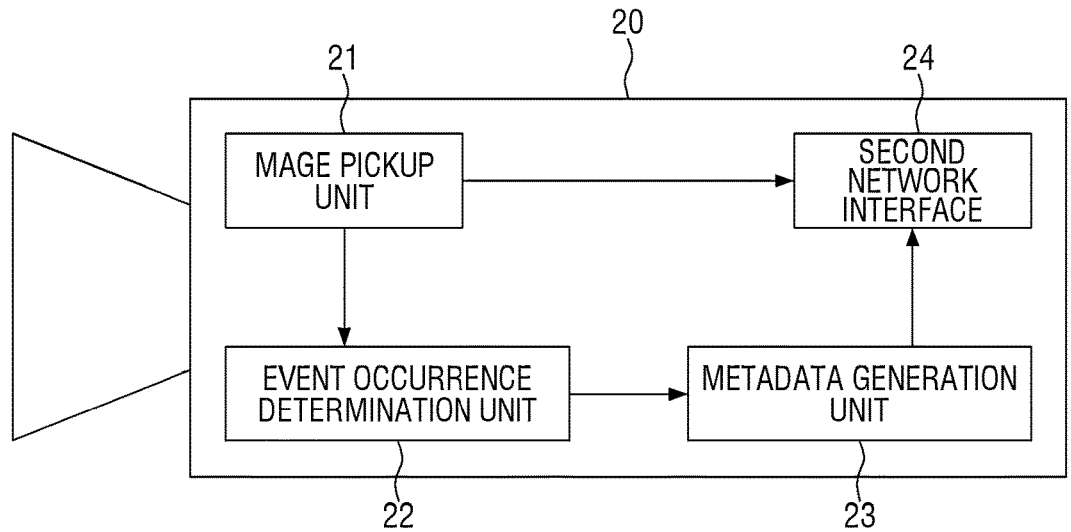
FIG. 3 is a block diagram of a camera 20 according to an embodiment of the present disclosure.
FIG. 4 illustrates metadata 3 according to an embodiment of the present disclosure which is generated when an event occurs.

FIG. 3 is a block diagram of a camera 20 according to an embodiment of the present disclosure.

The camera 20 includes an image pickup unit 21 which receives an image signal, a second network interface 24 which transmits videos and data to the monitoring apparatus 10 through the network 30, an event occurrence determination unit 22 which determines whether an event has occurred, and a metadata generation unit 23 which generates the metadata 3 (see FIG. 4) using information about an event when the event occurs. These components may be connected to a bus (not illustrated) through at least one interface or adapter or may be directly connected to the bus.

The image pickup unit 21 receives an image signal for a specific area. The image pickup unit 21 generally includes an image pickup device such as a CCD or a CMOS image sensor. The CCD accumulates electrons generated by a photoelectric effect when light is irradiated to a plurality of photodiodes and transmits the accumulated electrons. Here, image information that forms a screen is generated by analyzing a change in the amount of electrons generated according to the amount of photons and reconstructing information. The CCD has advantages of clear image quality and little noise but disadvantages of high power consumption and low processing speed.

The CMOS image sensor is an image sensor using a CMOS and includes an amplifier in each cell to immediately amplify electrons generated by light into an electrical signal and transmit the electrical signal. The CMOS image sensor is inexpensive and has low power consumption and high processing speed, but has a lot of noise.

The event occurrence determination unit 22 determines whether an event has occurred through a video analysis function. Here, the video analysis function refers to a function of separating the object 2 (see FIG. 6) from the background in a video and automatically extracting features of the object 2. To separate the object 2 from the background, for example, a window search technique can be used. In addition, the features of the object 2 can be extracted as binary coded features such as local binary patterns (LBP) or modified census transform (MCT) or can be extracted as histogram features, whose histogram is to be calculated later, such as speeded-up robust features (SURF), scale invariant feature transform (SIFT), or histogram of oriented gradients (HOG). Further, the event occurrence determination unit 22 may perform a face recognition function. The window search technique can be used to detect a face region of a person, and various methods such as adaboost, random forest, support vector machine (SVM), and neural network (NN) can be used as a classifier stored in a window. If the event occurrence determination unit 22 separates the object 2 from the background and extracts the features of the object 2 by performing the video analysis function, this video analysis result is converted into the metadata 3 and transmitted to the monitoring apparatus 10.

However, embodiments are not limited to this case, and a video analysis engine provided separately may also perform the video analysis function instead of the camera 20. In this case, the video analysis engine receives video streaming data directly from the camera 20 and performs the video analysis function. Then, video analysis result data may be converted into the metadata 3 and transmitted to the monitoring apparatus 10. That is, the monitoring system 1 can be formed in any form as long as the monitoring apparatus 10 can receive the video analysis result as the metadata 3.

The monitoring system 1 according to the embodiment of the present disclosure will be described below based on the assumption that the event occurrence determination unit 22 included in the camera 20 analyzes a video and determines whether an event has occurred. However, this is only for case of description and is not intended to limit the scope of rights.

When an event occurs, the metadata generation unit 23 generates the metadata 3 using information about the event. The metadata 3 is data that describes specific data and specifies the type of the specific data. The metadata 3 according to an embodiment of the present disclosure will be described in detail later.

The camera 20 may be connected to other devices through the network 30 and may transmit and receive various data and signals including the metadata 3. Here, the second network interface 24 may receive communication data in the form of one or more packets from the network 30, and the camera 20 may store the received communication data. Similarly, the camera 20 may store communication data to be transmitted in a storage unit (not illustrated) in the form of one or more packets, and the second network interface 24 may transmit the communication data to the network 30.

The second network interface 24 may include a second network interface card, a modem, etc., and the network 30 may include various wired/wireless communication methods such as the Internet, a WAN, a LAN, a telephone network 30, and direct connection communication.

FIG. 4 illustrates the metadata 3 according to an embodiment of the present disclosure which is generated when an event occurs.

When an event occurs, the metadata generation unit 23 generates the metadata 3 using information about the event as described above. The metadata 3 is data that describes specific data and specifies the type of the specific data for easy retrieval of the specific data. Here, while the specific data is data that is large in size and is not easy to retrieve, such as music or moving images, the metadata 3 is very small in size and easy to retrieve because it consists of a character string.

As illustrated in FIG. 4, the metadata 3 contains information about a unique ID of an identified object 2, the number of identified objects 2 (see FIG. 6), the position of the object 2, the time when an event occurred, an identifier of a camera 20 that obtained a video, etc. Specifically, in FIG. 4, utc may indicate information about the time when an event occurred, cam.ID may indicate an identifier of a camera 20 that obtained a video, and numObj may indicate the number of identified objects 2. Obj [0].left, right, top, bottom, etc. indicate the position of the object 2, that is, coordinate information of the position of each vertex of a virtual window surrounding the object 2.

In addition, obj [0].objID is an ID indicating a unique identifier of the object 2. Even if one object 2 moves or appears after disappearing for a while, the camera 20 still assigns the same ID to the object 2 by identifying it as the same object 2 through video analysis. However, if another object 2 appears, the camera 20 assigns a new ID to the object 2 by identifying it as a different object.

As described above, a plurality of cameras 20 are formed. After a specific ID is assigned to a specific object 2 in a first video captured by a first camera 20a, the object 2 may disappear from the first video of the first camera 20a and appear in a second video captured by a second camera 20b.

In this case, the second camera 20b assigns the object 2 the same ID as the specific ID assigned by the first camera 20a.

When the second camera 20b detects the appearance of the object 2 in the second video that it captured, it should communicate with the first camera 20a among the cameras 20. This is because the first camera 20a assigned the specific ID to the object 2 before the second camera 20b and because the second camera 20b can assign the same ID as the ID assigned by the first camera 20a only after identifying what ID the first camera 20a assigned to the object 2. The second camera 20b may communicate with the cameras 20 in order to identify which of the cameras 20 captured the object 2 first. Here, the cameras 20 may be directly connected to communicate with each other, but may also be connected using various methods, for example, through the monitoring apparatus 10 or a separate access point (AP). In addition, when the second camera 20b detects the occurrence of an event in which the specific object 2 appears, it first checks the time when the event occurred and selects cameras 20 that detected the occurrence of an event at a time close to the event occurrence time. Then, the second camera 20b compares video analysis results of the selected cameras 20 with its video analysis result for the object 2. If determining that a matching rate between the object 2 and the object 2 appearing in the video of the first camera 20a is higher than a specific level, the second camera 20b determines that the object 2 is the same object as the object 2 appearing in the video of the first camera 20a and identifies an ID assigned to the object 2 by the first camera 20a. Then, the second camera 20b assigns the object 2 the same ID as the ID assigned by the first camera 20a. Therefore, if a user searches for a video later, the video may be automatically converted by identifying the movement of the same object 2.

Here, the matching rate refers to the proportion of matching features among features of the object 2 extracted from each video through video analysis. The features are, for example, the type of a pet, the color of fur, the size of the body, etc. In addition, the specific level may be about 80 to 90%. However, the specific level is not limited to this example and can be set to various values.

Figure 5:
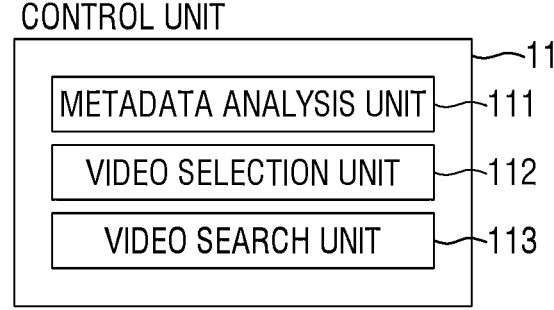
FIG. 5 is a detailed block diagram of a control unit 11 according to an embodiment of the present disclosure.

FIG. 5 is a detailed block diagram of the control unit 11 according to an embodiment of the present disclosure.

The control unit 11 includes a metadata analysis unit 111 which analyzes the metadata 3, the video selection unit 112 which selects a video in which an event occurred from a plurality of videos, and a video search unit 113 which searches for videos according to a user's command.

The metadata analysis unit 111 analyzes the generated metadata 3. As described above, the metadata 3 contains information about an identified object 2 (see FIG. 6), the position of the object 2, the time when an event occurred, an identifier of a camera 20 that obtained a corresponding video, etc. The metadata analysis unit 111 analyzes the metadata 3 transmitted from the camera 20 and sends information about the event to the video selection unit 112.

The video selection unit 112 selects a video in which an event occurred from videos transmitted from a plurality of cameras 20. Here, whether an event has occurred can be determined based on information received from the metadata analysis unit 111. When a motion event in which a specific object 2 appears and moves occurs in a video captured by a specific camera 20, the video selection unit 112 receives information about this event from the metadata analysis unit 111. In addition, the video selection unit 112 selects a video in which the motion event occurred from the videos obtained from the cameras 20. When the video selection unit 112 transmits the selected video to the screen unit 13, the screen unit 13 loads and displays the selected video so that the user can monitor the specific object 2.

If events occur in a plurality of videos due to the movement of the specific object 2, the video selection unit 112 may synthesize the videos in the time order in which the events occurred. In this case, if the specific object 2 moves to disappear from a first video and appear in a second video, the first video displayed on the screen unit 13 is naturally changed to the second video.

Further, if there are a plurality of objects 2, for example, if the user raises two or more pets, a plurality of events may occur simultaneously. In addition, the cameras 20 may obtain a plurality of videos by capturing the events, respectively. In this case, the video selection unit 112 may select all of the videos and synthesize the videos in a specific arrangement and then transmit the synthesized videos to the screen unit 13. Then, the screen unit 13 may generate a split screen according to the specific arrangement and display all of the videos simultaneously. Here, if the user selects one of the videos, the split screen may disappear, and the screen unit 13 may display only the video selected by the user.

As described above, the cameras 20 may obtain videos of the indoor space. In particular, the cameras 20 may obtain videos by capturing a pet or a child left in the indoor space while the user is out. This enables the user to easily monitor the pet or the child using the monitoring apparatus 10 even when the user is out. Meanwhile, an object 2 existing in the indoor space is generally one or two pets or one or two children. Accordingly, the number of events that occur simultaneously at a specific time is only a few. Therefore, even if a plurality of videos are all displayed simultaneously on a split screen generated, one segment of the split screen does not become too small.

In this way, the user can easily monitor the object 2 without missing the object 2 or having to check other cameras 20 one by one to find where the object 2 is located.

The video search unit 113 searches videos stored in the storage unit 12 for videos that match a search condition input by the user. The user can monitor the current situation of the areas captured by the cameras 20 through real-time live videos. In addition, the user can search for a video that matches a specific search condition among the videos stored in the storage unit 12 and then monitor the found video. In this case, the user inputs a search condition such as a time condition in order to search for a video. Then, the video search unit 113 searches the stored metadata 3. When the metadata 3 about videos that match the search condition are found, the video selection unit 112 selects a video in which an event occurred from the videos corresponding to the metadata 3. Then, the video selection unit 112 transmits the selected video to the screen unit 13, and the screen unit 13 displays the selected video so that the user can monitor the specific object 2. In this way, a video matching the specified search condition can be quickly retrieved as a search result among the videos stored in the storage unit 12.

Each component of the monitoring apparatus 10 described above may be implemented as a software component, such as a task, a class, a subroutine, a process, an object 2, an execution thread or a program performed in a predetermined region of a memory, or a hardware component, such as a field-programmable gate array (FPGA) or application-specific integrated circuit (ASIC). In addition, the components may be composed of a combination of the software and hardware components. The components may be reside on a computer-readable storage medium or may be distributed over a plurality of computers.

And each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 6:
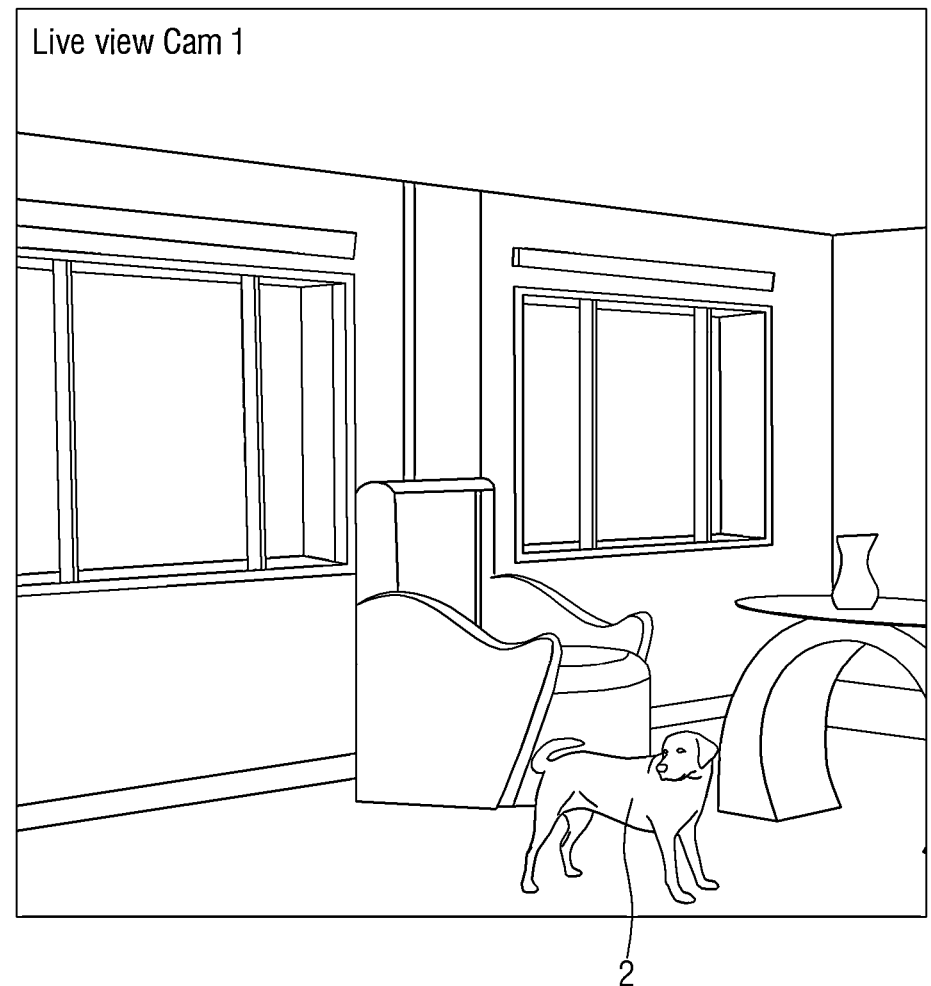
FIG. 6 illustrates a case where a first video of an object 2, such as a pet or a child, in which an event occurred is automatically displayed on the monitoring apparatus 10 according to the embodiment of the present disclosure.

FIG. 6 illustrates a case where a first video of an object 2, such as a pet or a child, in which an event occurred is automatically displayed on the monitoring apparatus 10 according to the embodiment of the present disclosure.

A process in which the monitoring system 1 according to the embodiment of the present disclosure operates will now be described in detail using an example.

A plurality of cameras 20 are installed in various directions at various locations in an indoor space. For example, in a typical home, the first camera 20a may be installed in a living room, the second camera 20b may be installed in a room, and a third camera 20c may be installed in a kitchen. Each of the cameras 20 obtains a video of an area that it captures.

Here, when a user executes the operation of the monitoring apparatus 10 according to the embodiment of the present disclosure, the monitoring apparatus 10 prepares to receive data. In addition, each of the cameras 20 transmits streaming data and metadata 3 of a video that it obtained to the monitoring apparatus 10. Here, when a motion event in which a specific object 2 in the living room moves occurs, the first camera 20a installed in the living room determines that the event has occurred through the video analysis function and extracts features of the object 2. Then, the metadata generation unit 23 of the first camera 20a generates the metadata 3 containing information about the event that occurred. When the monitoring apparatus 10 receives the video streaming data and the metadata 3 from each of the cameras 20, the metadata analysis unit 111 analyzes the metadata 3 and transmits information about an event to the video selection unit 112. Based on this information, the video selection unit 112 recognizes that an event is currently occurring or has most recently occurred in the first video and selects the first video. When the video selection unit 112 transmits the first video to the screen unit 13, the screen unit 13 loads and displays the received first video as illustrated in FIG. 6. In this way, the monitoring apparatus 10 displays a video in which an event is currently occurring or has most recently occurred among a plurality of videos received. Therefore, the user can immediately monitor the object 2 without having to search for the object 2 by checking the videos obtained by the cameras 20 one by one.

Figure 7:
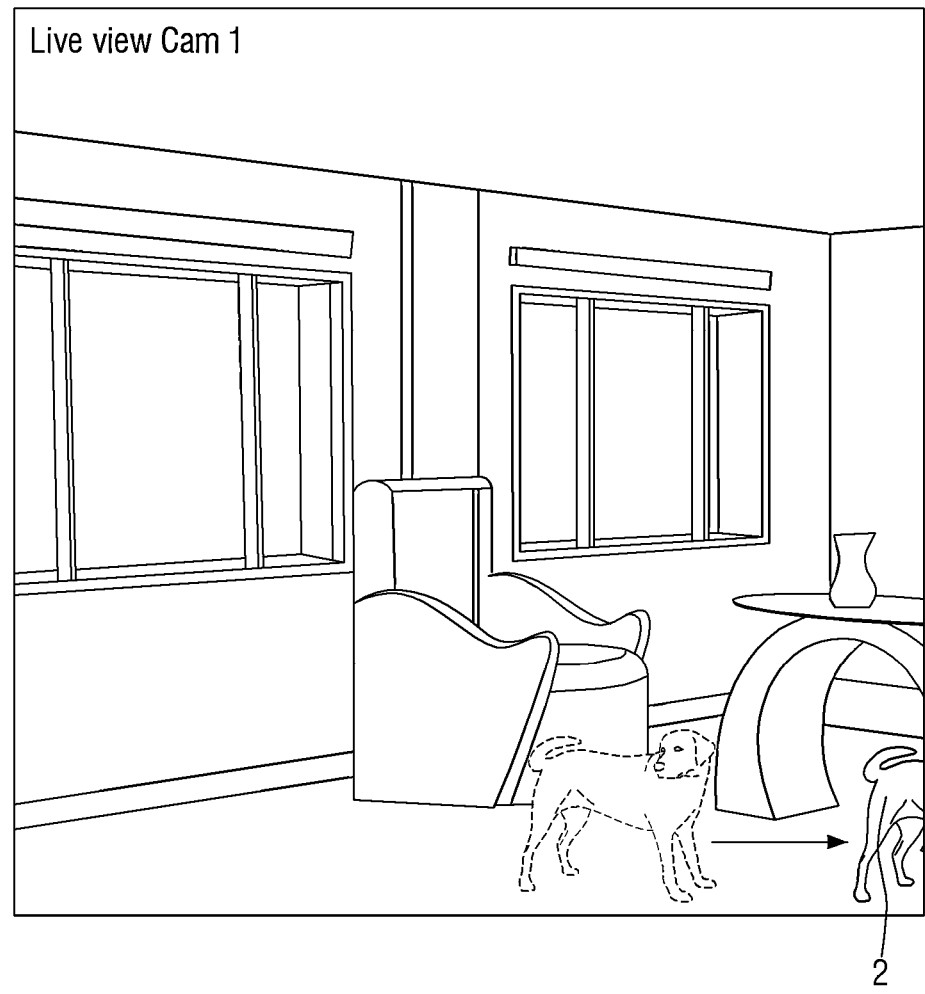
FIG. 7 illustrates a case where the object 2 moves from FIG. 6 to another space and thus disappears from the first video displayed on the monitoring apparatus 10 according to the embodiment of the present disclosure.

FIG. 7 illustrates a case where the object 2 moves from FIG. 6 to another space and thus disappears from the first video displayed on the monitoring apparatus 10 according to the embodiment of the present disclosure.

The object 2 such as a pet or a child does not always stay in one space. For example, the object 2 in the living room may move to another space such as the kitchen or the room. Here, if the first camera 20a is capturing only the living room, the object 2 may not be included in an angle of view of the first camera 20a after the object 2 moves. Even if the first camera 20a is a pan-tilt camera or a 360-degree camera, if the object 2 moves to another space separated from the living room by a wall, the object 2 exists in a blind spot of the first camera 20a. Therefore, the first camera 20a can no longer capture the object 2, and the object 2 disappears from the first video as illustrated in FIG. 7. In this case, the first camera 20a cannot determine whether an event has occurred in the first video that it obtained.

Figure 8:
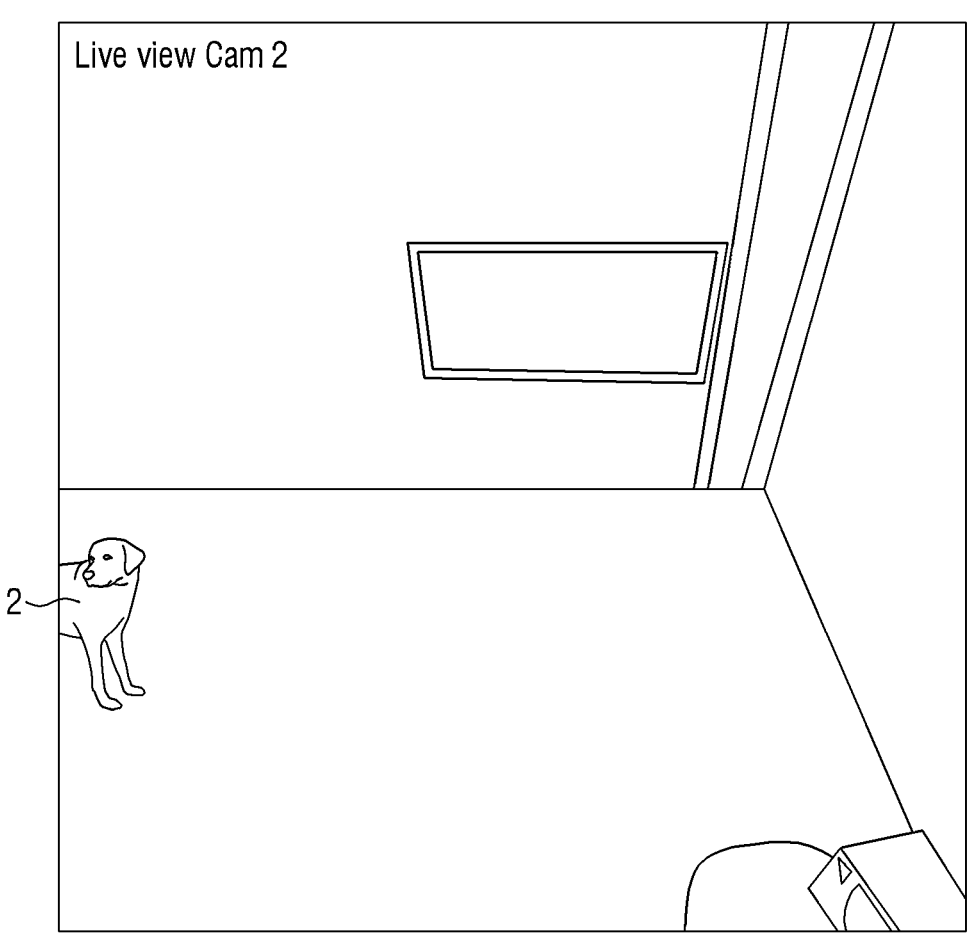
FIG. 8 illustrates a case where the object 2 moves from FIG. 7 to another space and appears in a second video displayed on the monitoring apparatus 10 according to the embodiment of the present disclosure.
Figure 9:
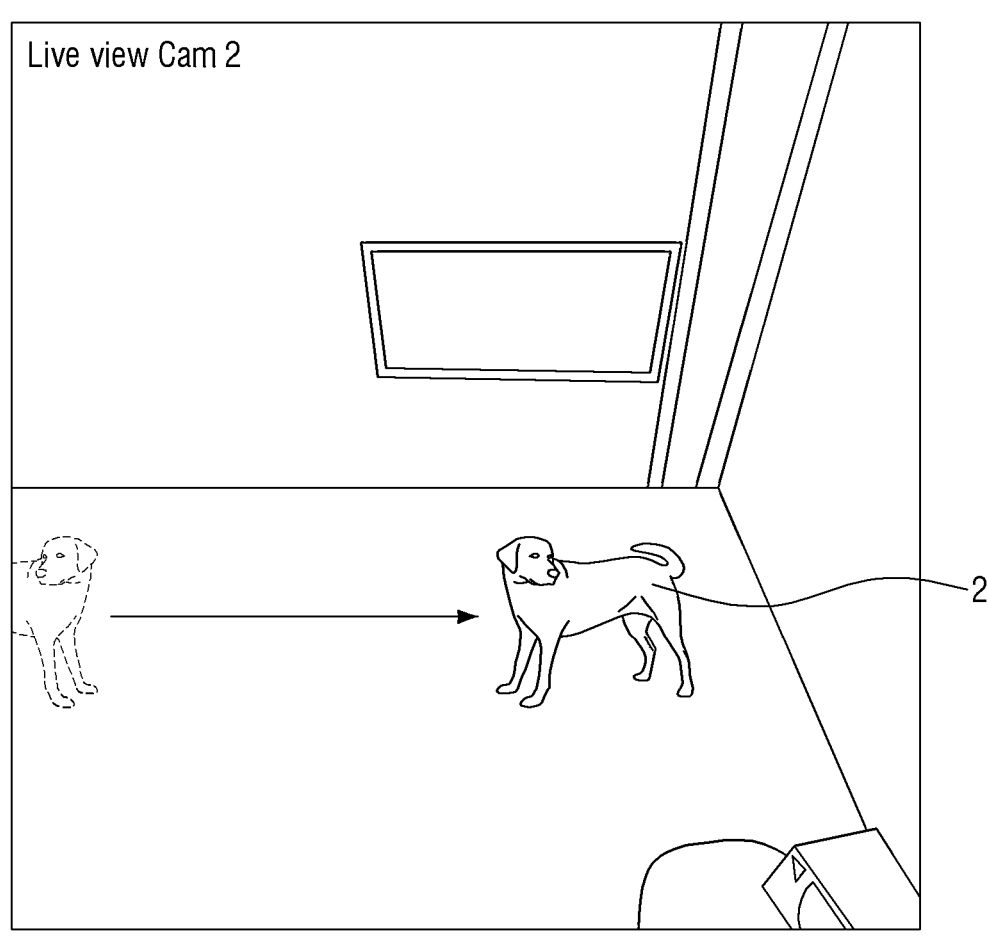
FIG. 9 illustrates a case where the second video of the space to which the object 2 moved completely is displayed on the monitoring apparatus 10 according to the embodiment of the present disclosure.

FIG. 8 illustrates a case where the object 2 moves from FIG. 7 to another space and appears in a second video displayed on the monitoring apparatus 10 according to the embodiment of the present disclosure. FIG. 9 illustrates a case where the second video of the space to which the object 2 moved completely is displayed on the monitoring apparatus 10 according to the embodiment of the present disclosure.

Other cameras 20 are installed in other spaces such as the kitchen and the room. Here, the object 2 may move from the living room to the room as illustrated in FIG. 8. Then, the second camera 20b installed in the room determines that an event has occurred through the video analysis function and extracts features of the object 2. In addition, the second camera 20b checks the time when the event occurred and selects, from the cameras 20, cameras 20 that detected the occurrence of an event at a time close to the event occurrence time by communicating with the cameras 20 through the network 30. Then, the second camera 20b compares video analysis results of the selected cameras 20 with its video analysis result for the object 2. If determining that a matching rate between the object 2 and the object 2 appearing in the video of the first camera 20a is higher than a specific level, the second camera 20b determines that the object 2 is the same object as the object 2 appearing in the video of the first camera 20a and identifies an ID assigned to the object 2 by the first camera 20a. Then, the second camera 20b assigns the object 2 the same ID as the ID assigned by the first camera 20a. The metadata generation unit 23 of the second camera 20b generates the metadata 3 containing information about the event that occurred, such as the assigned ID of the object 2, the time when the event occurred, an identifier of the second camera 20b, etc.

When the monitoring apparatus 10 receives the video streaming data and the metadata 3 from each of the cameras 20, the metadata analysis unit 111 analyzes the metadata 3 and transmits information about an event to the video selection unit 112. Based on this information, the video selection unit 112 recognizes that an event is currently occurring or has most recently occurred in the second video and selects the second video. When the video selection unit 112 stops transmitting the first video and transmits the second video, the screen unit 13 stops displaying the first video and loads and displays the received second video as illustrated in FIGS. 8 and 9. Therefore, a user can immediately monitor the object 2 without having to check a plurality of videos one by one to find the object 2 that disappeared.

Figure 10:
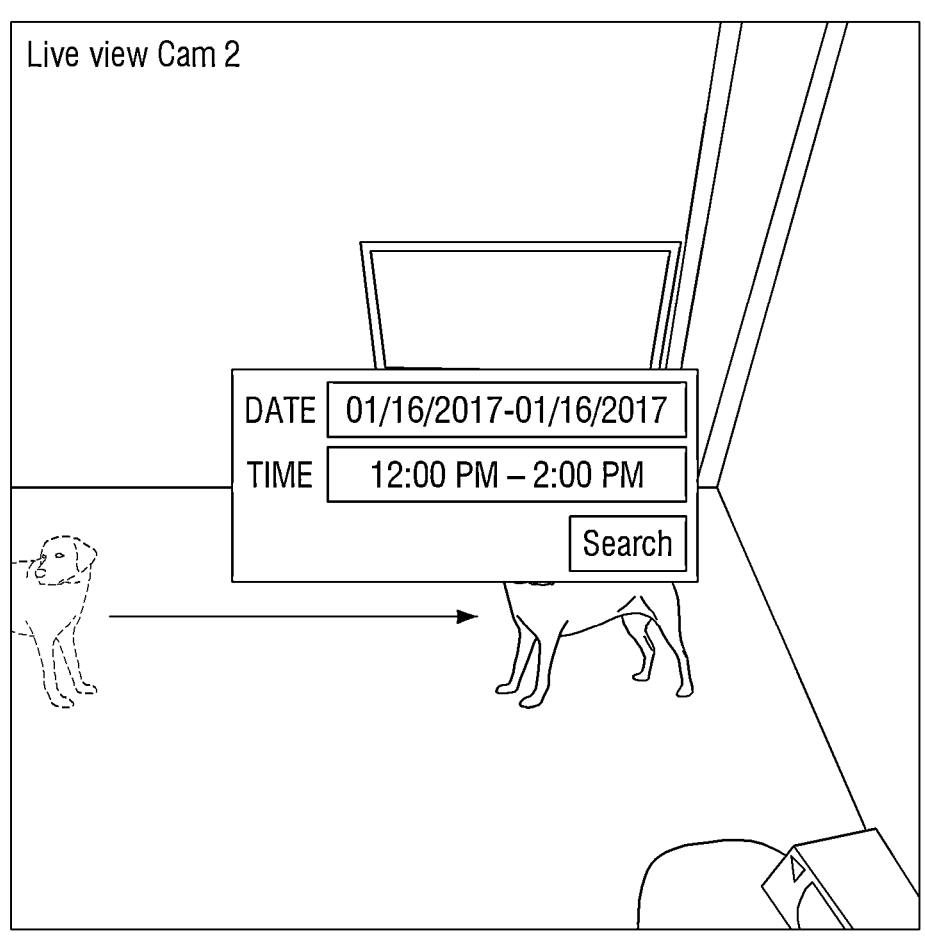
FIG. 10 illustrates a case where a search condition is input to the monitoring apparatus 10 according to the embodiment of the present disclosure so as to search for videos.

FIG. 10 illustrates a case where a search condition is input to the monitoring apparatus 10 according to the embodiment of the present disclosure so as to search for videos.

As described above with reference to FIGS. 6 through 9, the monitoring apparatus 10 may immediately display a video obtained by a camera 20. Therefore, a user can easily grasp the current situation by monitoring such as a live video.

However, there is a case where the user desires to check the content of an event that has already occurred. For example, if the user finds a broken vase in the living room when returning home after going out, he or she may want to monitor what event occurred in the past.

If the monitoring apparatus 10 according to the embodiment of the present disclosure is used, not only a live video but also a video previously obtained and stored can be displayed. To this end, the user first inputs a search condition as illustrated in FIG. 10. The user may enter the date and time that the user wants to monitor and then click or touch a 'Search' button.

Figure 11:
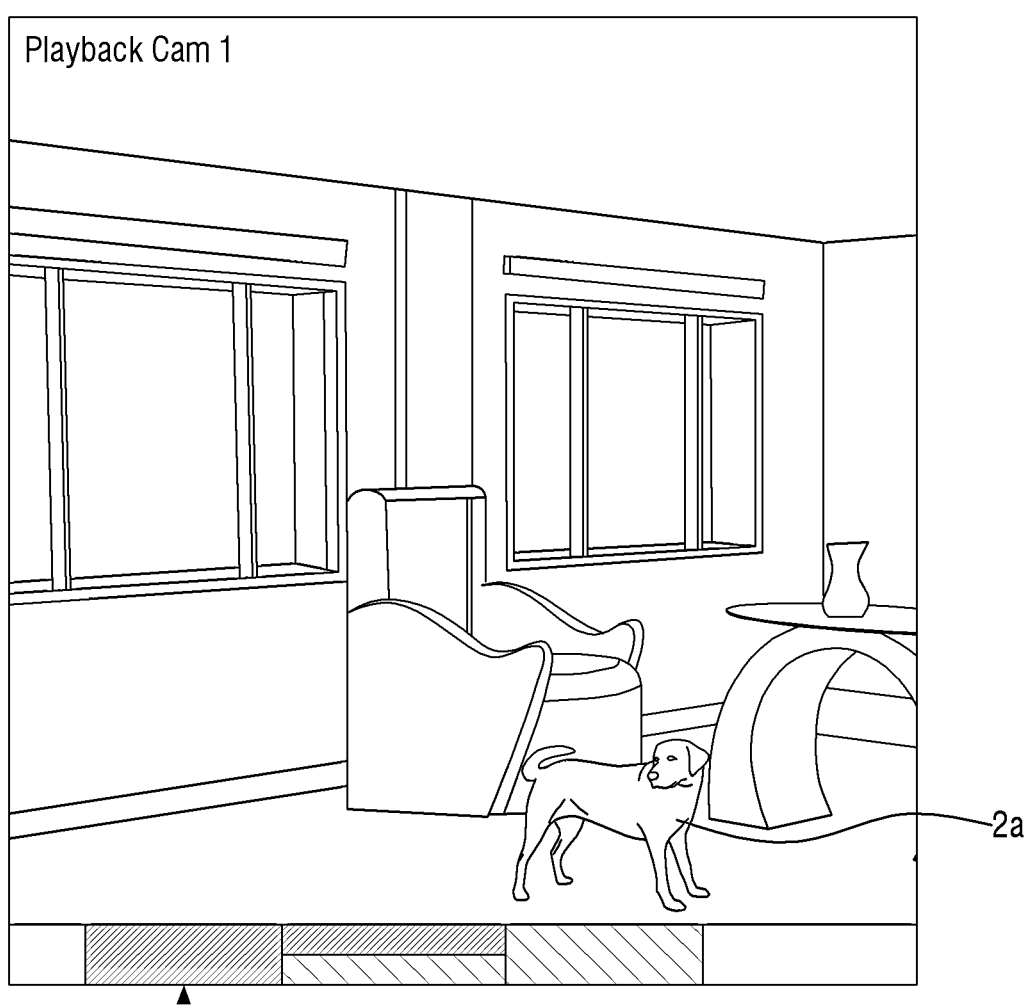
FIG. 11 illustrates a case where a video in which an event occurred among videos matching the search condition input in FIG. 10 is displayed on the monitoring apparatus 10 according to the embodiment of the present disclosure.

FIG. 11 illustrates a case where a video in which an event occurred among videos matching the search condition input in FIG. 10 is displayed on the monitoring apparatus 10 according to the embodiment of the present disclosure.

If a plurality of cameras 20 are always capturing the indoor space, a plurality of videos are stored. Therefore, when a user performs a video search by inputting a search condition as illustrated in FIG. 10, the video search unit 113 retrieves a plurality of videos matching the search condition as search results.

However, an event does not always occur in all areas captured by the cameras 20. If a motion event in which the object 2 moves in the living room occurs at a time input as the search condition, the first camera 20a installed in the living room may generate the metadata 3 containing information about the event. Using the information about the event in the metadata 3, the video selection unit 112 may identify that the event that occurred at the above time is included in the first video obtained by the first camera 20a. Therefore, the video selection unit 112 selects the first video from a plurality of videos. When the video selection unit 112 transmits the first video to the screen unit 13, the screen unit 13 loads and displays the received first video as illustrated in FIG. 11.

Figure 12:
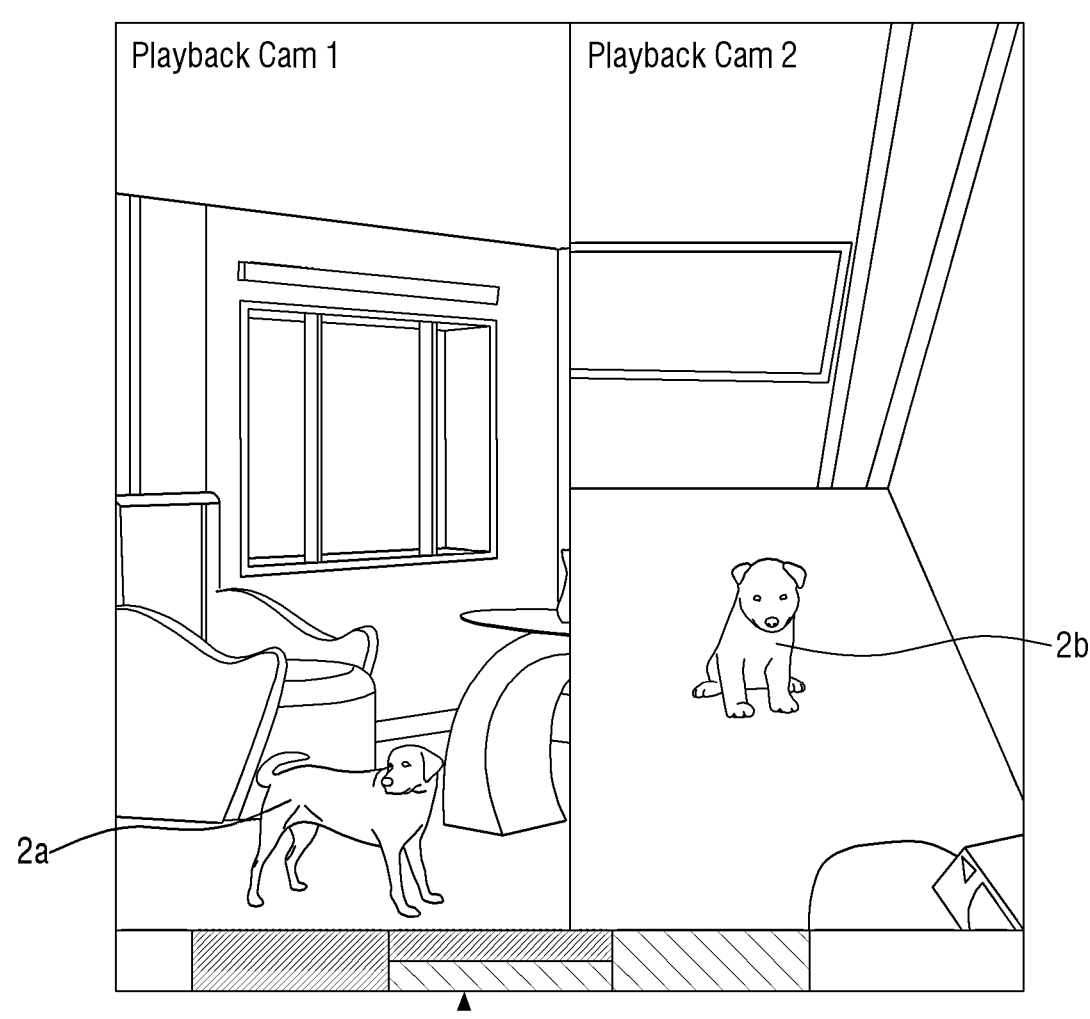
FIG. 12 illustrates a case where when events occur in a plurality of videos in FIG. 11, the monitoring apparatus 10 according to the embodiment of the present disclosure generates a split screen and simultaneously displays the videos.
Figure 13:
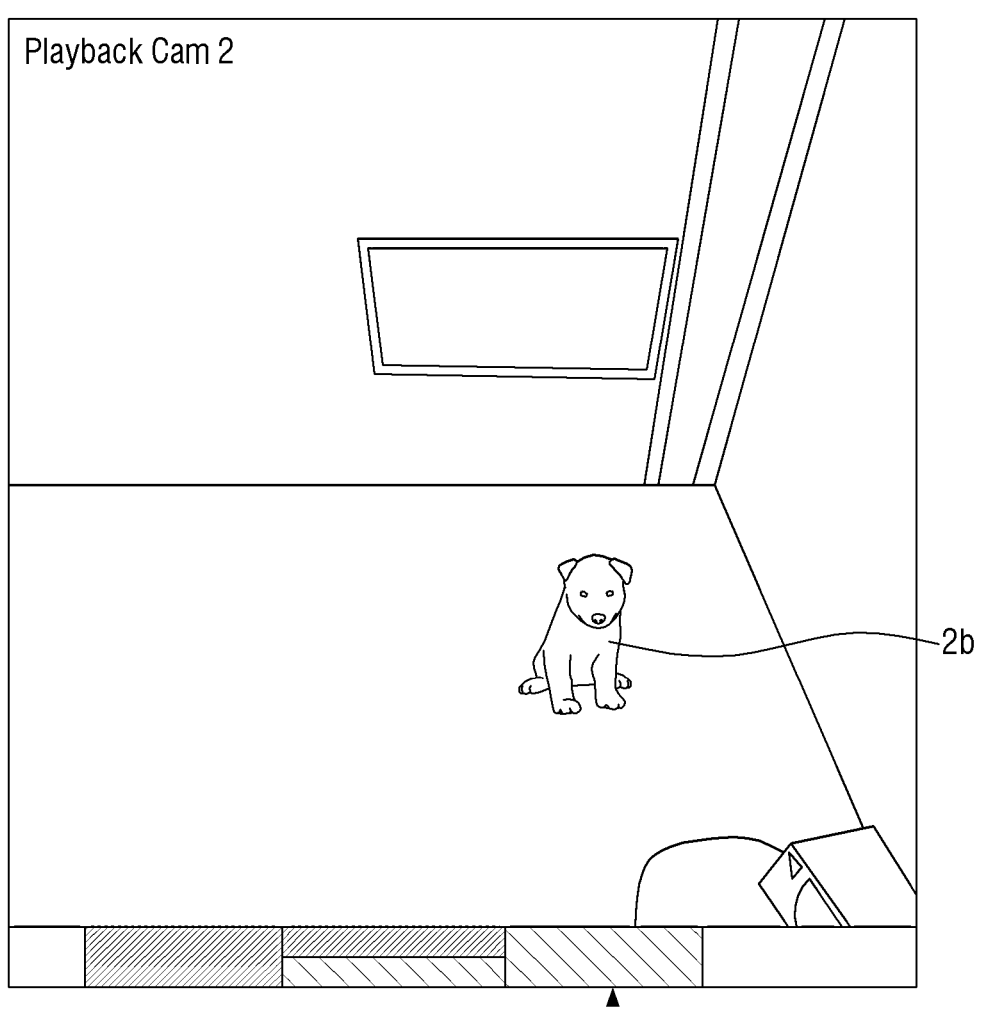
FIG. 13 illustrates a case where when an event in one video of FIG. 12 ends, the monitoring apparatus 10 according to the embodiment of the present disclosure no longer displays the video in which the event ended.

FIG. 12 illustrates a case where when events occur in a plurality of videos in FIG. 11, the monitoring apparatus 10 according to the embodiment of the present disclosure generates a split screen and simultaneously displays the videos. FIG. 13 illustrates a case where when an event in one video of FIG. 12 ends, the monitoring apparatus 10 according to the embodiment of the present disclosure no longer displays the video in which the event ended.

As described above, when there are a plurality of objects 2a and 2b, a plurality of events may occur simultaneously. In addition, a plurality of cameras 20 may obtain videos by capturing the events, respectively. In this case, the video selection unit 112 may select all of the videos and synthesize the videos and then transmit the synthesized videos to the screen unit 13. Then, the screen unit 13 may generate a split screen and simultaneously display all of the videos as illustrated in FIG. 12.

Here, the video selection unit 112 may synthesize the videos by arranging the videos horizontally or vertically. Alternatively, if the number of videos increases, the videos may be arranged in a lattice. The videos may be the same or different sizes. Further, if a user inputs a command to change the arrangement of the videos while monitoring the videos, the video selection unit 112 changes the arrangement of the videos according to the user's command. Then, the screen unit 13 generates a split screen as the videos are synthesized. When the user selects one of the videos, the split screen may disappear, and the screen unit 13 may display only the selected video.

There may be a case where a plurality of events occur from a time corresponding to a start condition in a search condition input by the user. In this case, a plurality of videos may be simultaneously displayed from the beginning. However, there may also be a case where one event occurs at the time corresponding to the start condition, and then a plurality of events occur later. For example, in a state where different objects 2a and 2b exist in the living room and the room, respectively, the first object 2a existing in the living room may move, resulting in a motion event. However, the second object 2b existing in the room may sleep without moving and, after a certain period of time, may move, resulting in another motion event.

In this case, the video selection unit 112 may synthesize a plurality of videos in the time order in which the events occurred. First, only the first video may be selected from the time corresponding to the start condition. Therefore, the screen unit 13 of the monitoring apparatus 10 may initially display only the first video as illustrated in FIG. 11. Then, the first video and the second video may be synthesized from a time when the second object 2b starts to move. Therefore, after a certain period of time, the screen unit 13 of the monitoring apparatus 10 may display a composite video of the first video and the second video as illustrated in FIG. 12.

The first video and the composite video of the first video and the second video may also be synthesized in the time order. Therefore, videos can be naturally displayed despite the generation of a split screen.

While the first object 2a and the second object 2b are moving in the living room and the room, respectively, if the first object 2a stops moving and sleeps, only the second object 2b may move from that time. Then, the video selection unit 112 cancels the selection of the first video and selects only the second video. In this case, only the second video is synthesized behind the composite video of the first video and the second video in the time order. Therefore, the screen unit 13 displays only the second video as illustrated in FIG. 13. At this time, the user does not monitor the first object 2a which stopped moving and monitors only the second object 2b which keeps moving.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation. The scope of the present disclosure is defined by the following claims, rather than by the above-described detailed description. The meanings and scope of the claims, and all modifications or modified shapes, which are derived from equivalent concepts thereof, should be understood as being included in the scope of the present disclosure.

What is claimed is:

1. A monitoring apparatus comprising:
   a communication interface configured to receive streaming data and metadata of a video from each of a plurality of cameras when the cameras obtain videos by capturing specific areas, respectively;
   at least one processor configured to implement:
   a metadata analysis unit configured to analyzes the received metadata and extract information about an event that occurred; and
   a video selection unit configured to select at least one video containing an area in which the event occurred from the videos based on the extracted information about the event; and
   a display configured to receive the at least one video from the video selection unit and display the received video,
   wherein, when an event occurs in a first video of the at least one video, the display is configured to display only the first video on a screen,
   subsequently, when another event occurs in a second video of the at least one video, the display is configured to resize the first video to a reduced size and display the resized first video and the second video together on the screen, and afterward, when the event ends in the first video, the display is configured to resize the second video to an enlarged size and display only the resized second video on the screen.

2. The monitoring apparatus of claim 1, wherein the display is configured to display the resized first video and the second video together on the screen in a time order in which the event occurs.

3. The monitoring apparatus of claim 1, wherein if the area in which the event occurred exists in plural numbers, the video selection unit is configured to select a plurality of videos containing the areas in which the event occurred.

4. The monitoring apparatus of claim 3, wherein the video selection unit is configured to synthesize the videos in a specific arrangement and transmit the synthesized videos to the display.

5. The monitoring apparatus of claim 4, wherein the display is configured to generate a split screen according to the specific arrangement.

6. The monitoring apparatus of claim 5, wherein when one of the videos is selected by a user, the display is configured to display only the video selected by the user.

7. The monitoring apparatus of claim 1, wherein the videos are real-time live videos.

8. A monitoring apparatus comprising:
a communication interface configured to receive streaming data and metadata of a video from each of a plurality of cameras when the cameras obtain videos by capturing specific areas, respectively;
at least one processor configured to implement:
a metadata analysis unit configured to analyze the received metadata and extract information about an event that occurred; and
a video selection unit configured to select at least one video containing an area in which the event occurred from the videos based on the extracted information about the event;
a display configured to receive the selected video from the video selection unit and display the received video; and
a storage unit configured to store the received streaming data and metadata of the videos,
wherein, when an event occurs in a first video of the at least one video, the display is configured to display only the first video on a screen,
subsequently, when another event occurs in a second video of the at least one video, the display is configured to resize the first video to a reduced size and display the resized first video and the second video together on the screen, and
afterward, when the event ends in the first video, the display is configured to resize the second video to an enlarged size and display only the resized second video on the screen.

9. The monitoring apparatus of claim 8, wherein the display is configured to display the resized first video and the second video together on the screen in a time order in which the event occurs.

10. The monitoring apparatus of claim 9, wherein the processor is further configured to implement a video search unit configured to receive a search condition and retrieve videos matching the search condition as search results among the videos stored in the storage unit.

11. The monitoring apparatus of claim 10, wherein the video selection unit is configured to select the video containing the area in which the event occurred from the videos retrieved as the search results.

12. The monitoring apparatus of claim 8, wherein if the area in which the event occurred exists in plural numbers, the video selection unit is configured to select a plurality of videos containing the areas in which the event occurred.

13. The monitoring apparatus of claim 12, wherein the video selection unit is configured to synthesize the videos in a specific arrangement and transmit the synthesized videos to the display.

14. The monitoring apparatus of claim 13, wherein the display is configured to generate a split screen according to the specific arrangement.

15. The monitoring apparatus of claim 14, wherein when one of the videos is selected by a user, the display is configured to display only the video selected by the user.

16. The monitoring apparatus of claim 8, wherein the videos are videos previously captured and stored in the storage unit.

17. A monitoring system comprising:
a plurality of cameras installed indoors and each comprising an image pickup unit which obtains a video by capturing a specific area and an event occurrence determination unit which determines whether an event has occurred in the video; and
a monitoring apparatus comprising a communication interface configured to receive streaming data and metadata of the video from each of the cameras, at least one processor configured to implement at least one video selection unit configured to select a video containing an area in which the event occurred from videos obtained by the cameras based on information about the event that occurred, and a display configured to receive the selected video from the video selection unit and display the received video,
wherein, when an event occurs in a first video of the at least one video, the display is configured to display only the first video on a screen,
subsequently, when another event occurs in a second video of the at least one video, the display is configured to resize the first video to a reduced size and display the resized first video and the second video together on the screen, and
afterward, when the event ends in the first video, the display is configured to resize the second video to an enlarged size and display only the resized second video on the screen.

18. The monitoring system of claim 17, the at least one processor further configured to implement a storage unit configured to store the received streaming data and metadata of the videos, wherein the videos are videos previously captured and stored in the storage unit.

19. The monitoring system of claim 18, the at least one processor further configured to implement a video search unit configured to receive a search condition and retrieve videos matching the search condition as search results among the videos stored in the storage unit, wherein the video selection unit is configured to select the video containing the area in which the event occurred from the videos retrieved as the search results.

20. The monitoring system of claim 17, wherein the display is configured to display the resized first video and the second video together on the screen in a time order in which the event occurs.

* * * * *